United States Patent
Qin et al.

(10) Patent No.: US 12,116,308 B2
(45) Date of Patent: Oct. 15, 2024

(54) FOLDABLE ULTRATHIN GLASS WITH TRANSPARENT, IMPACT-RESISTANT HARD COATING

(71) Applicant: Nano and Advanced Materials Institute Limited, Hong Kong (HK)

(72) Inventors: Shiwei Qin, Hong Kong (HK); Yong Zhu, Hong Kong (HK); Yubo Cheng, Hong Kong (HK); Jianping Han, Hong Kong (HK); Chui Wan Tse, Hong Kong (HK); Chenmin Liu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 179 days.

(21) Appl. No.: 17/903,055

(22) Filed: Sep. 6, 2022

(65) Prior Publication Data

US 2023/0088192 A1 Mar. 23, 2023

Related U.S. Application Data

(60) Provisional application No. 63/242,564, filed on Sep. 10, 2021.

(51) Int. Cl.
*C03C 17/30* (2006.01)
*C03C 21/00* (2006.01)
*C09D 183/06* (2006.01)

(52) U.S. Cl.
CPC ............ *C03C 17/30* (2013.01); *C03C 21/002* (2013.01); *C09D 183/06* (2013.01);
(Continued)

(58) Field of Classification Search
CPC ....................... G02B 1/14; C03C 17/30; C09D 183/04–183/16
See application file for complete search history.

(56) References Cited

U.S. PATENT DOCUMENTS 10,941,067 B2 3/2021 He et al.
2018/0101253 A1* 4/2018 He ........................ C03C 27/10
(Continued)

FOREIGN PATENT DOCUMENTS

CN 111936310 A 11/2020
CN 112135803 A 12/2020
(Continued)

OTHER PUBLICATIONS

Choi et al. "Flexible Hard Coating: Glass-Like Wear Resistant, Yet Plastic-Like Compliant, Transparent Protective Coating for Foldable Displays", Advanced Materials, 29, (2017); pp. 1700205-1 to 1700205-7.*
(Continued)

*Primary Examiner* — Prashant J Khatri
(74) *Attorney, Agent, or Firm* — Idea Intellectual Limited; Margaret A. Burke; Sam T. Yip

(57) ABSTRACT

A foldable ultrathin glass article includes an ultrathin chemically-tempered foldable glass substrate having a thickness of approximately 100 microns or less and a compressive surface stress of at least 100 MPa. A single-layer hard coating is bonded to the first and/or second surface of the ultrathin tempered glass foldable substrate without an adhesive layer. The hard coating includes at least one silsesquioxane having a silicon-oxygen core framework directly bonded to the ultrathin tempered glass foldable substrate. The impact resistance defined by a maximum pen drop height without glass failure is at least four times greater than the ultrathin tempered glass foldable substrate without the hard coating. The hard coating has a surface hardness of at least 7H surface hardness and has a hydrophobic surface with a water contact angle of at least 100°. The coating has a transparency of at least 98 percent compared to uncoated substrates.

15 Claims, 10 Drawing Sheets

(52) U.S. Cl.
CPC .... *C03C 2217/78* (2013.01); *C03C 2218/111* (2013.01); *C03C 2218/31* (2013.01)

(56) References Cited

U.S. PATENT DOCUMENTS

| | | | |
|---|---|---|---|
| 2018/0142127 A1* | 5/2018 | Park | C08G 59/22 |
| 2018/0223127 A1* | 8/2018 | Cho | C08L 71/02 |
| 2018/0237658 A1* | 8/2018 | Yoon | C09D 183/04 |
| 2020/0097044 A1 | 3/2020 | Kim et al. | |
| 2020/0398530 A1 | 12/2020 | Kuo et al. | |
| 2022/0055348 A1 | 2/2022 | Xiao et al. | |

FOREIGN PATENT DOCUMENTS

| | | | |
|---|---|---|---|
| CN | 112703105 A | 4/2021 | |
| CN | 112876989 A | 6/2021 | |
| CN | 113004790 A | 6/2021 | |
| JP | 2007065438 A | 3/2007 | |
| WO | WO-2020096757 A1 * | 5/2020 | B32B 17/10 |

OTHER PUBLICATIONS

"A Guide to Silane Solutions from Dow Corning". Dow Corning, (2005); pp. 1-29.*

Chansomwong et al., "Facile preparation of wear-resistant and anti-fingerprint hard coating with chemisorption of fluorosilane by simple wet coating", Journal of Sol-Gel Science and Technology (2020), p. 1-9.

Liu et al., "Transparent Omniphobic Coating with Glass-Like Wear Resistance and Polymer-Like Bendability", Angewandte Chemie (2019), p. 1-18.

Office Action of the corresponding China patent application No. 202211092724.4 mailed on Apr. 22, 2024.

* cited by examiner

FOLDABLE ULTRATHIN GLASS WITH TRANSPARENT, IMPACT-RESISTANT HARD COATING

CROSS-REFERENCE TO RELATED APPLICATION

The present application claims domestic priority from provisional U.S. Patent Application 63/242,564 filed 10 Sep. 2021 the disclosure of which is incorporated by reference herein.

FIELD OF THE INVENTION

The present disclosure relates to foldable ultrathin glass with transparent hard coatings which provides the foldable glass with high impact resistance and high transparency.

BACKGROUND OF THE INVENTION

Ultra-thin glass (UTG) has strong potential as a cover substrate for flexible electronic display screens due to its higher surface hardness, moisture resistance, lower crease tendency and better hand sensation than traditional plastic film substrates. However, the ultra-thin glass's fragility requires a protective hard coating to provide impact resistance and bending durability. Further, film characteristics such as anti-scratch and anti-fingerprint features are required for practical applications in mobile phones.

Various potential coatings for ultra-thin glass have been proposed. Zhang et al. (Angwandte Chemie Int.'l 2019) found that an omniphobic hard coating with high flexibility and wear resistance can be obtained by modifying glycidyl polyhedral oligomeric silsesquioxane (POSS) with a PDMS chain. Chansomwong et al. (J. of Sol-Gel Sci. and Tech.) treated a cured flexible hard coat 'Flex9H' with plasma, TEOS primer and fluorosilane to provide a bendable, anti-scratch, and anti-fingerprint hard coating.

US2020/0097044 A1 discloses a hard-coat layer on a protective cover for a flexible display. The coating is a silica acrylate polymer matrix which may have a pencil hardness of only greater than 1H, but may prevent cracks and improve bending durability of the support substrate. However, the silica-based acrylate material requires an adhesive layer.

US 2020/0398530 A1 discloses a glass article including a UTG layer and a polymeric hard-coat layer having a pencil hardness of at least 8H, providing at least 3 times the pen drop height of a control and a bend radius of 3 mm or less. The layer also requires an adhesive layer on the glass article.

In disclosures, common requirements for protective covers layer are described. However, these references do not provide sufficient UTG impact resistance improvement. Further, the prior art fails to create all of the required properties in a single hard coating. The present invention addresses these needs.

SUMMARY OF THE INVENTION

To provide a solution for the problem above, the present invention, which will be described in two aspects, suggests a remarkable impact resistant hard coating with additional functions bonded to a UTG cover substrate.

In one aspect, the present invention provides a foldable ultrathin glass article. The article includes an ultrathin chemically-tempered foldable glass substrate having a thickness of approximately 100 microns or less, a compressive surface stress of at least 100 MPa, and first and second surfaces. The article further includes a single-layer hard coating bonded to the first and/or second surface of the ultrathin tempered glass foldable substrate without an adhesive layer. The hard coating includes at least one silsesquioxane having a silicon-oxygen core framework directly bonded to the ultrathin tempered glass foldable substrate. The ultrathin tempered glass foldable substrate with the hard coating bonded thereto has an impact resistance, defined by a maximum pen drop height at which the substrate passes a pen drop test, that is at least four times greater than the ultrathin tempered glass foldable substrate without the hard coating. The hard coating has a surface hardness of at least 7H surface hardness and has a hydrophobic surface with a water contact angle of at least 100°. The ultrathin tempered glass foldable substrate with the hard coating has a transparency of at least 98 percent for light ranging from 400-700 nm when compared to an ultrathin tempered glass foldable substrate without the hard coating.

In another aspect, the ultrathin chemically-tempered foldable glass substrate is chemically tempered through surface ion exchange.

In another aspect, the silsesquioxane is a polyorganosilsesquioxane represented by Formula 1:

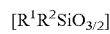
$$[R^1R^2SiO_{3/2}]$$ Formula 1 where $R^1$ is at least one photo curable or thermally curable cross-linking group, $R^2$ is at least one functional group with low surface energy and hydrophobicity;

wherein a molar ratio of overall $R^1$ to overall $R^2$ ranges from 100:1 to 1:100, and wherein a GPC evaluated number-average molecular weight has a range of 1000-30000.

In another aspect, $R^1$ is an epoxy-cyclohexane group, a glycidyl group or an acrylate group.

In another aspect, $R^2$ is a fluorocarbon, alkyl or polydimethylsiloxane (PDMS).

In another aspect, the impact resistance of the ultrathin tempered glass foldable substrate with the hard coating bonded thereto is at least approximately six times an impact resistance of the ultrathin tempered glass foldable substrate without the hard coating.

In another aspect, the ultrathin tempered glass foldable substrate with the hard coating bonded thereto has a water contact angle of at least 110° before and a remaining water contact angle of at least 90° after 2500 abrasion cycles using #0000 steel wool and 2.45 N/cm² pressure.

In another aspect, the hard coating has a surface hardness of 8H-9H pencil surface hardness.

In another aspect, an adhesion between the hard coating and the ultrathin chemically-tempered foldable glass substrate is at least 4B after a 30-minute 95° C. water bath test measured by a cross-hatch adhesion test.

In another aspect, the hard coating uses a curing agent selected from a radical initiator, a cationic initiator, an amine, an imidazole, or an amino-formaldehyde, or others according to the cross-linking group $R^1$, while the $R^2$ group.

In another aspect, the hard coating has a thickness in a range of 5-100 micrometers.

In another aspect, the hard coating is disposed on both the first and second surfaces of the ultrathin chemically-tempered foldable glass substrate.

In another aspect, the hard coating is disposed on the first surface of the ultrathin chemically-tempered foldable glass substrate and a further coating is disposed on the second surface of the ultrathin chemically-tempered foldable glass substrate.

In another aspect, the ultrathin chemically-tempered foldable glass substrate is pretreated prior to the hard coating being deposited thereon.

In another aspect, the pretreatment is a combustion chemical vapor deposition treatment, a silane treatment, a plasma treatment, or fire treatment.

In another aspect, the article can withstand bending of at least approximately 200,000 cycles.

In another aspect, the present invention includes a foldable display including the foldable ultrathin glass article with the hard coating.

In one aspect, the disclosure is directed to a transparent hard coating layer disposed on one side or double sides of an ultra-thin glass substrate, where the protected UTG article has a 4 times or more improved impact resistance or anti-puncture ability, which is defined by the maximum pen drop height at which of the article passes a pen drop test, than that of a bare control glass. The pen drop height is measured by the Pen Drop Test with specific pen weight, pen point and method.

In another aspect, the disclosure is directed to the method of producing the transparent impact resistant hard coating disposed on single or double surface of an ultra-thin glass substrate, where the protected UTG article has a 4 times or more improved impact resistance or anti-puncture ability, which is defined by the maximum pen drop height at which the article passes a pen drop test, than that of a bare control glass.

DETAILED DESCRIPTION

The details of the present invention will be described in the following embodiments. It should be understood that the specific embodiments are provided for an illustrative purpose only, and should not be interpreted in a limiting manner.

Figure 1A:
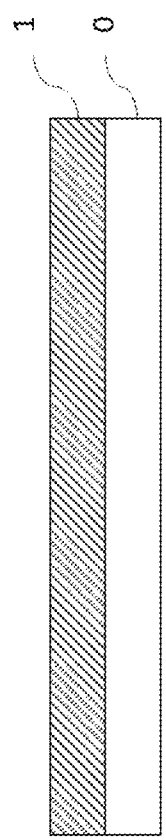
FIG. 1A illustrates a cross-sectional view of the single hard coating layer protected ultrathin glass article.

Turning to the drawings in detail, FIG. 1A depicts an ultrathin glass substrate 0 with a hard coating layer 1 disposed on the substrate. Hard coating layer 1 is a single layer that does not require a separate adhesive layer to bond layer 1 to substrate 0. The ultrathin glass substrate 0 may be a chemically-tempered foldable glass substrate. In chemical tempering, a glass is strengthened by substituting a larger element such as potassium for the sodium in the glass (e.g., through use of a potassium nitrate bath), causing the surface of the glass to be in a state of compression.

Other processing applied to obtain the ultra-thin glass substrates include draw-down processing of molten glass prior to the chemical tempering. Ultra-thin glasses are commercially available from suppliers such as Schott UTG®, Corning®, and Dinorex UTG™ Nippon Electric Glass.

Figure 1B:
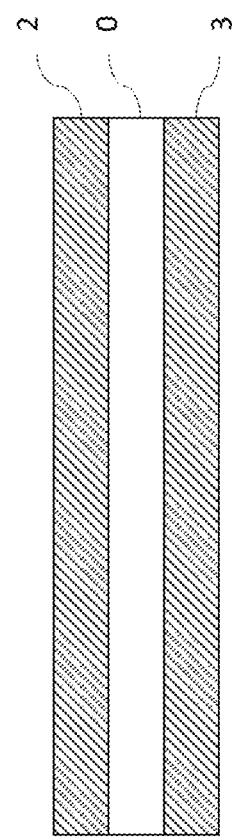
FIG. 1B illustrates a cross-sectional view of a double hard coating layers protected ultrathin glass article.
Figure 1C:
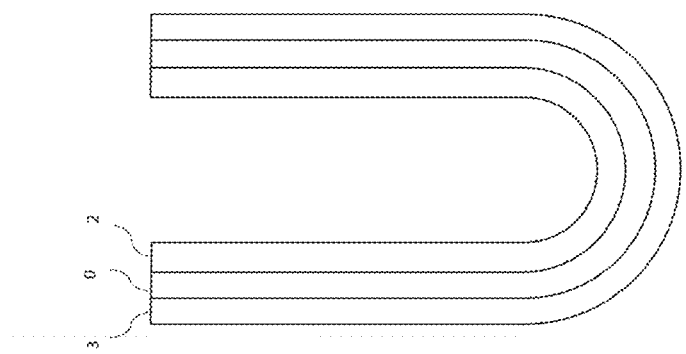
FIG. 1C illustrates a cross-sectional view of a bent double hard coating layers protected UTG article.

FIG. 1B depicts an ultrathin glass substrate 0 with hard coating 2 disposed on one surface and a second coating layer 3 disposed on the other surface. In one embodiment, the second coating layer 3 may also be the same as the hard coating layer 2 or may be a different coating.

Figure 6:
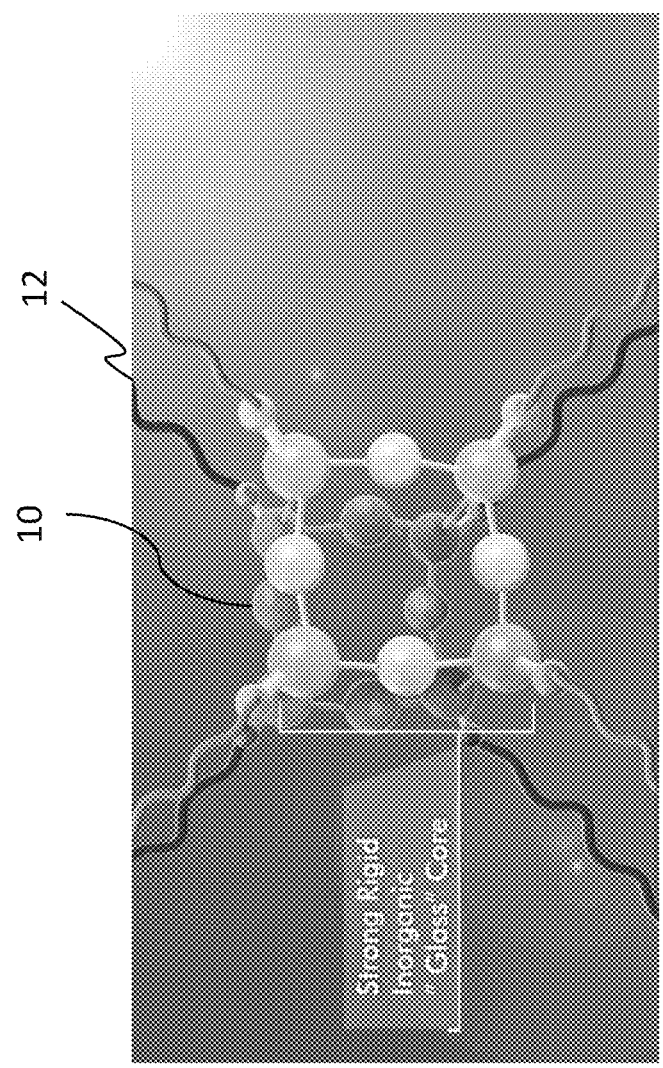
FIG. 6 is a schematic depiction of an inorganic core unit of a coating.
Figure 7:
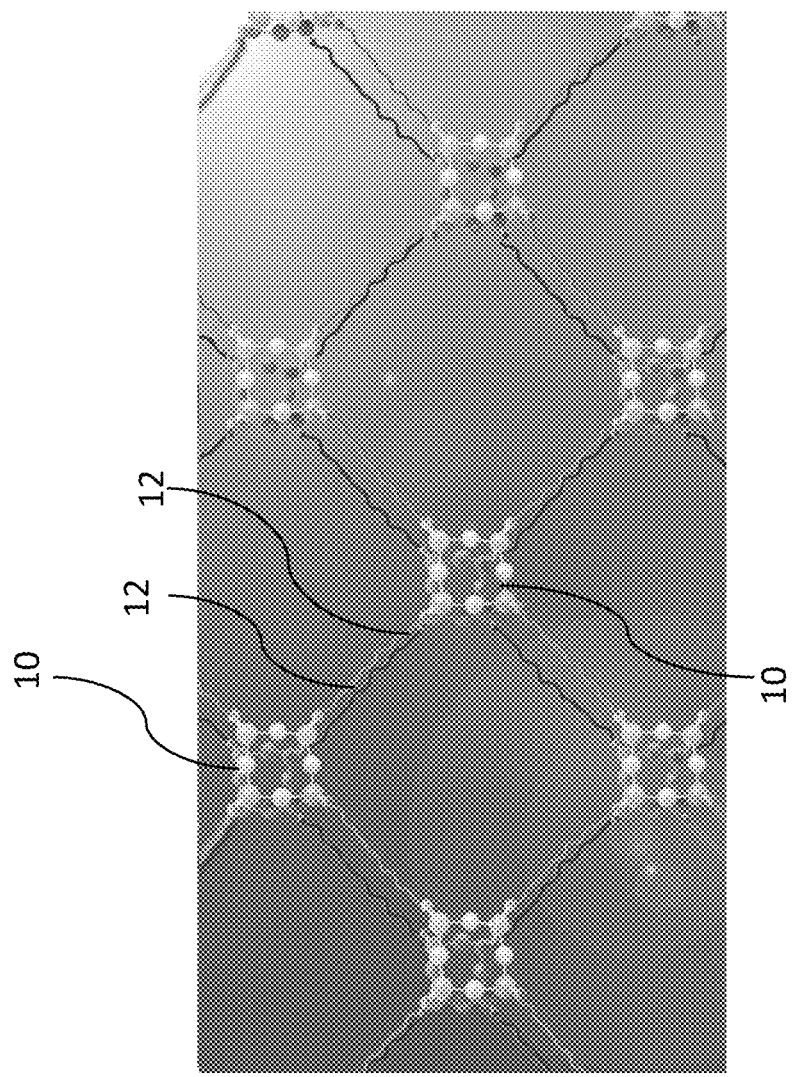
FIG. 7 is a schematic depiction of several inorganic core units of a coating with organic chains extending from the core.
Figure 8:
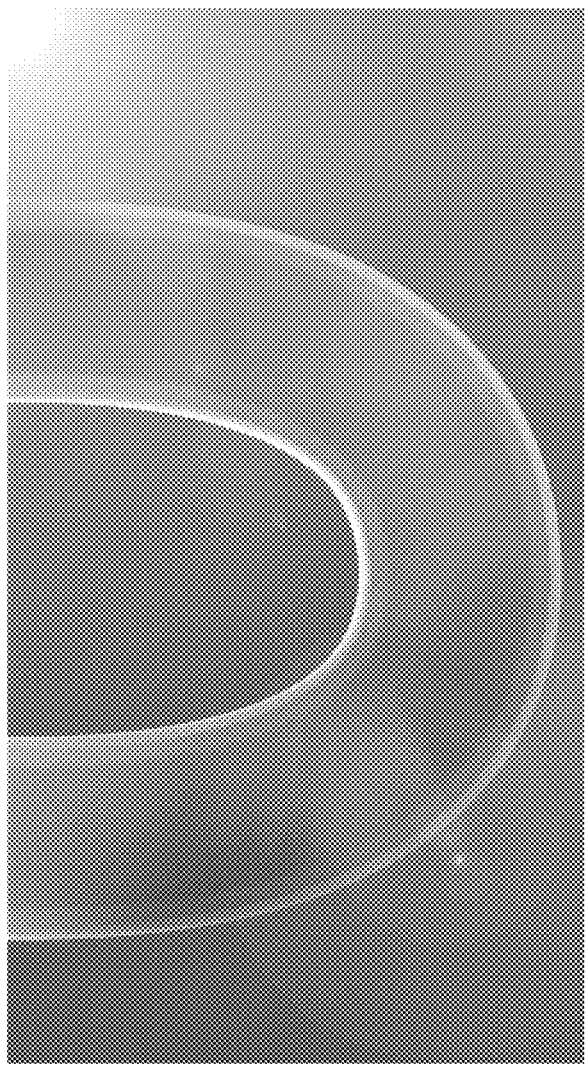
FIG. 8 is a depiction of a coated ultrathin glass article during bending.

Coatings 1 and 2 (and, optionally, coating 3) include at least one silsesquioxane having a silicon-oxygen core framework directly bonded to the ultrathin tempered glass foldable substrate. FIG. 6 depicts the core silicon-oxygen framework 10 with polymer chains 12 extending from the core framework. As such, it is an essentially inorganic "core" with organic polymer chains leading out from the inorganic core. The inorganic ceramic core portion creates a coating with high hardness while the polymer chains binding the core permit the coating to have high bendability. Because glass is made up of a network of silicon and oxygen atoms, the silicon-oxygen core framework readily bonds with the glass network and organic polymer chains can connect with the hydroxyl groups on the UTG surface, ensuring good adhesion strength of the coatings to the UTG. The organic polymer chains of silsesquioxane can also crosslink with each other, providing good cohesion among silsesquioxanes. Thus, an excellent bond strength of coating to UTG can be achieved without the use of adhesives. As seen in FIG. 7, the polymer chains 12 from each silicon-oxygen structure 10 bond with polymer chains 12 from adjacent silicon-oxygen structures 10.

The silsesquioxane may have a formula of $[R^1R^2SiO_{3/2}]$, where $R^1$ is at least one photo/thermal curable cross-linking group, such as an epoxy-cyclohexane group, glycidyl group or acrylate group. $R^2$ is at least one functional group with low surface energy and hydrophobicity such as a fluorocarbon or polydimethylsiloxane (PDMS). The molar ratio of overall $R^1$ to overall $R^2$ ranges from 100:1 to 1:100.

In some embodiments, the coating material has a number-average molecular weight of 1000-30000, which is controlled by synthetic conditions like base type, base concentration, temperature, solvent type and solvent volume. As shown in Table. 2, the molecular weight may be evaluated by gel permeation chromatography (GPC). The measurement conditions are listed below:

TABLE 1

| Measurement conditions | |
|---|---|
| Column: | Plgel 5 μm 1000A (7.5 mmI.D.*30 cm) + Plgel 3 μm 100A (7.5 mmI.D.*30 cm), Agilent, US |
| Flow rate: | 1 ml/min |
| Temperature: | 30° C. |
| Eluent: | THF |
| Detector: | RI |
| Standard: | PS |

Table 2, below, shows the GPC data of coating materials with different molecular weight distributions, including number average molecular weight (Mn), area percentage and polydispersity (PD). All the GPC chromatographs of coating materials showed two peaks.

TABLE 2

Determination of Molecular Number ($M_n$) by GPC

| | Peak_1 | | | Peak_2 | | |
|---|---|---|---|---|---|---|
| Sample Name | $M_n$ | Area percentage | PD | $M_n$ | Area percentage | PD |
| Low $M_n$ polyorganosilsesquioxane | 2925 | 40% | 1.118 | 1358 | 60% | 1.032 |
| High $M_n$ polyorganosilsesquioxane | 7702 | 93% | 1.664 | 1442 | 7% | 1.028 |

Depending upon the particular selection of additives, the hard coating layer [$R^1R^2SiO_{3/2}$] may be formed by photo or thermal curing. The curing agent may be selected from radical initiators, cationic initiators, amines, imidazoles, amino-formaldehydes or others according to the selection of the particular cross-linking group $R^1$. The $R^2$ group may be introduced to the structure of hard coating material during either the synthesis process or the later curing process. In addition, there may be further additives to the composition such as leveling agents, reactive dilutors or anti-virus agents.

In FIG. 1A, the hard coating layer 1 is only disposed on the outer side of the ultra-thin glass substrate 0. The thickness of the hard coating 1 may be in a range of 5-100 micrometers. The thickness is preferred to be a range of 5-60 microns and further preferred to be in a range of 5-40 microns.

In FIG. 1B, the hard coating layers 2, 3 are formed on each side of the ultra-thin glass substrate 0. The hard coating 2 may have the same composition or a different composition to hard coating 3. The selection of the $R^1$ and $R^2$ groups and the ratio of $R^1$:$R^2$ groups in 2 may or may not be the same as in coating 3. The thickness of coating 2 ranges from 5-100 micrometers which may be the same or not as that of coating 3. The thickness of coating 2 is preferred to be smaller than that of coating 3.

The transparent hard coating layers disposed on one or both sides of the ultra-thin glass substrate create an ultra-thin glass article that has at least 4 times greater impact resistance or anti-puncture ability; this is defined by a maximum pen drop height at which the article passes a pen drop test, compared to that of an uncoated control ultra-thin glass substrate.

Figure 2:
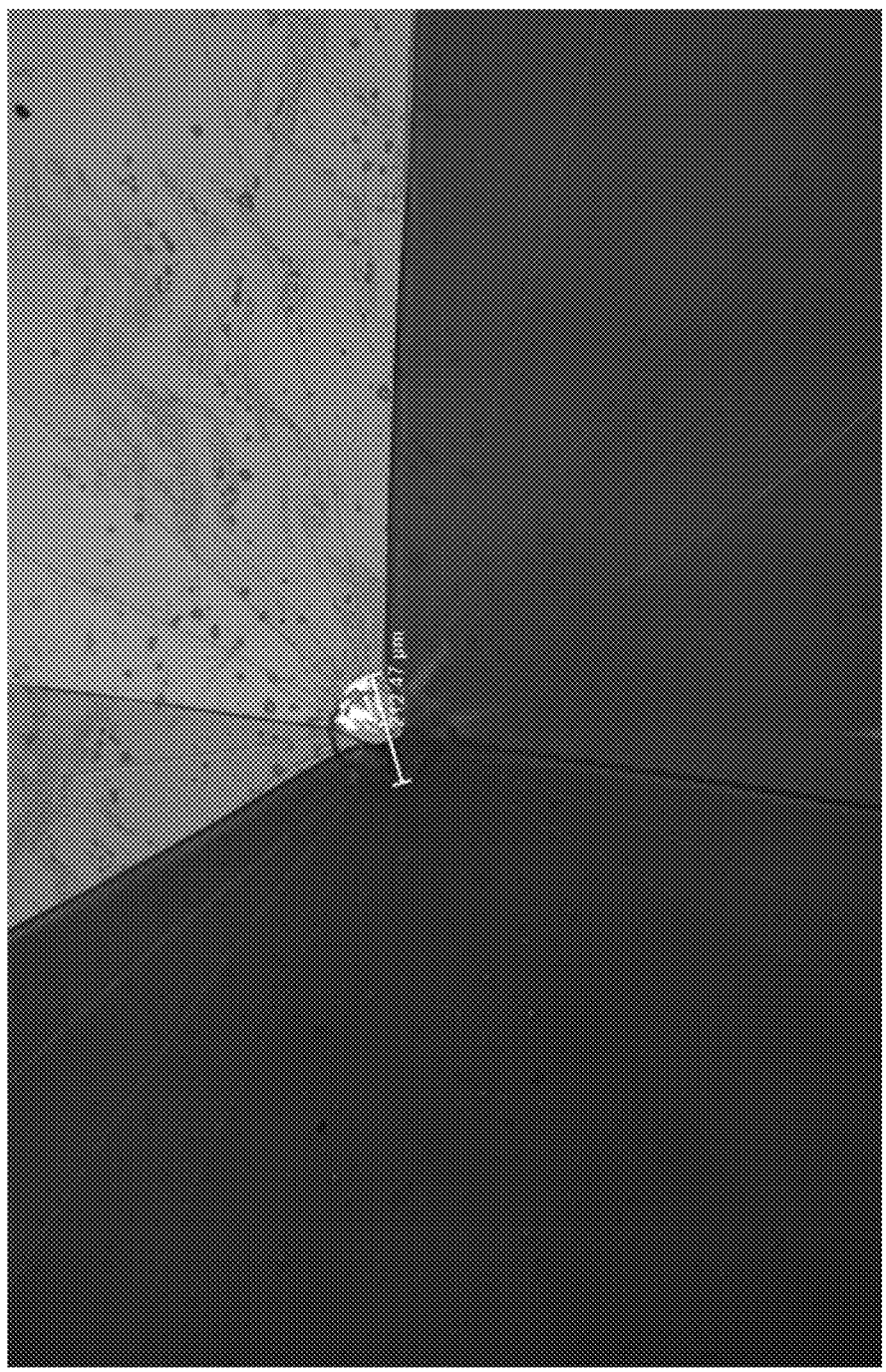
FIG. 2 illustrates a microscope photo of the failed pen drop result of a UTG article sample.

For the Pen Drop Test, the glass article sample is fixed on the surface of an aluminum plate and a transparent tube is located perpendicularly on the sample top surface. An M&G® Pen G-5 refill having a 0.5 mm bullet pen point and a weight of 12 gram is employed and a tube having an inside diameter of 17 mm, an outside diameter of 21 mm and a total length of 40 cm is employed. The G-5 pen refill is changed after 5 drops. In each test, the pen is dropped from an initial height of 1 cm to the sample surface, followed by successive tests at heights of 2 cm, 3 cm, 4 cm etc., until failure. As shown in FIG. 2, the failure of the test is represented by an obvious crack on the sample which can be observed by naked eyes.

Figure 3:
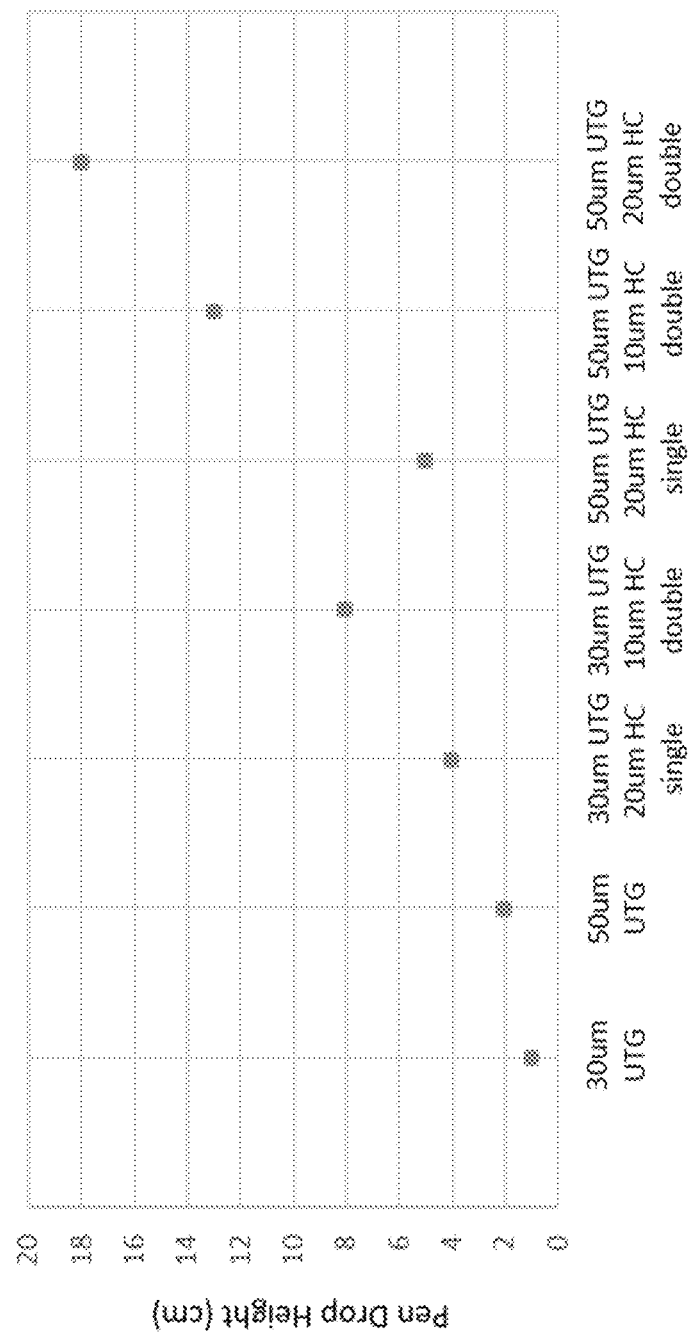
FIG. 3 is a graph of pen drop performance of UTG samples with different hard coating (HC) thickness.

In some embodiments, as depicted in FIG. 3, the outer single side hard coating-protected UTG article may have a 4 times or more improved impact resistance or anti-puncture ability, which is defined by the maximum pen drop height at which the article passes the pen drop test, compared to that of a bare, uncoated control glass. The double-side protected ultra-thin glass articles may have a 6-9 times improved impact resistance, substantially larger than a single side protected article, even if the total thickness of the hard coating layers 2+3 is similar to that of the single hard coating 1. In general, the greater the total thickness of the hard coating layers, the better the pen drop resistance.

Figure 4:
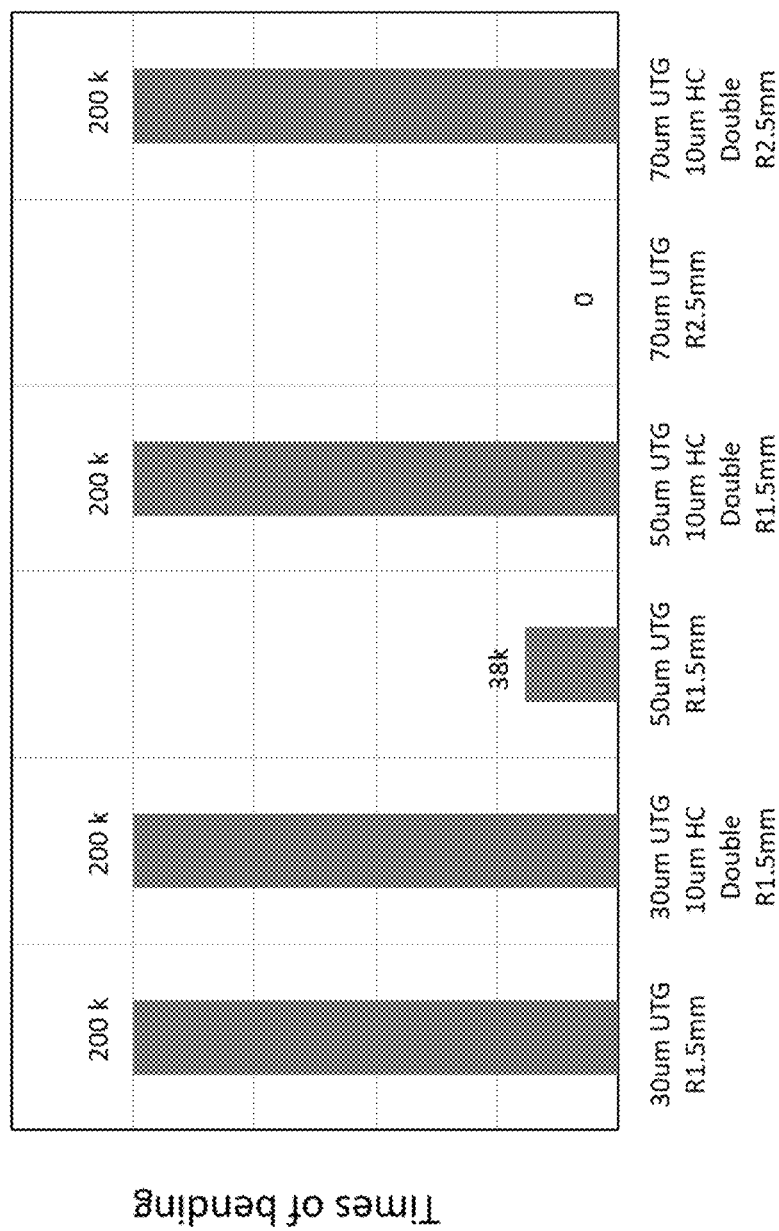
FIG. 4 is a graph of bending durability performance of different UTG samples.
Figure 5A:
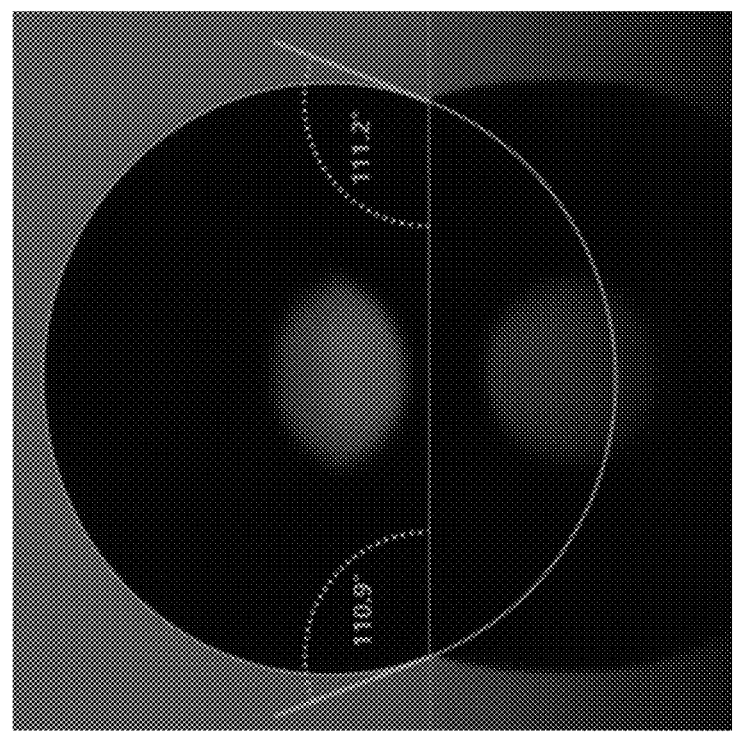
FIG. 5A is a graph of water contact angle before abrasion.
Figure 5B:
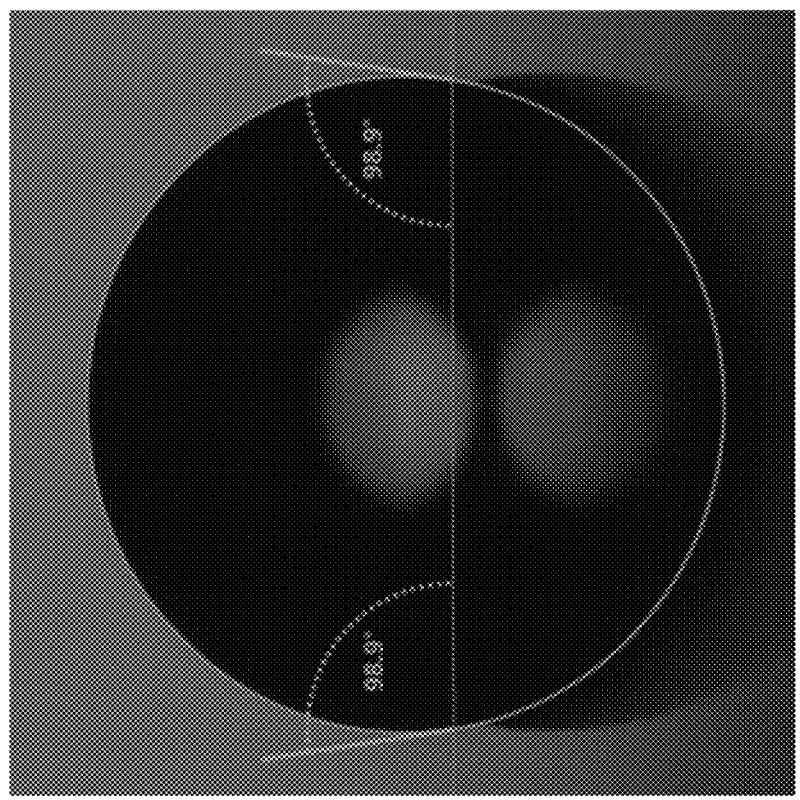
FIG. 5B is a graph of water contact angle after abrasion.

The bending durability is evaluated by the number of times of continuous folding with a specific bend radius until failure of the coated ultra-thin glass article or upon reaching 200,000 (200 k) repetitions. The bend radius of 30 μm and 50 μm UTG is set to 1.5 mm and bend radius of 70 μm UTG is 2.5 mm. FIG. 4 indicates that the double side coating on the ultra-thin glass articles have no negative effect on the bending durability, and in some cases, may improve the bending durability. This observation may be explained that HC layer fills and makes up the possible micro cracks (or invisible defects) on UTG and prevents the crack propagation. Notably, the thickness of coating layer 2 is not larger than the thickness of coating layer 3, or an unbalanced stress may result that has a negative effect on bending durability.

In some embodiments, the hard coating bonded to the ultra-thin glass substrate has anti-smudge ability and anti-scratch ability. The coating surface has a water contact angle (WCA, 5 μL of deionized water) of 110° or more, and after 2500 abrasion cycles using #0000 steel wool and 2.45 N/cm² pressure (performed by ZL-1073 abrasion tester supplied by Dongguan Zhongli Instrument Technology), the water contact angle is at least 90°. The initial water contact angle and anti-scratch ability are both determined by the ratio of $R^1$:$R^2$ in the final cured coating material. The higher relative content of $R^2$ and the longer fluorocarbon chain in $R^2$ may result in the higher WCA and lower anti-scratch ability at the same time.

Typically, the transparency of the hard coating for light ranging from 300-800 nm is 98% or greater.

The hardness of the hard coating on the ultra-thin glass substrate is 7-9H (750 gram load) which is determined by the specific selected coating formula and coating thickness. The pencil hardness is only decreased by 1-2H as compared to the bare glass substrate. JIS K 5600-5-4 and ISO 15184-980 are the tests used for this determination.

The hard coating may have a high anti-scratch property in which there are no scars after 300-2500 times of #0000 steel wool abrasion under 2.45 N/cm² pressure.

The adhesion between the hard coating and ultra-thin glass substrate after a 30-minute 95° C. water bath test is measured by a cross-hatch adhesion test. The adhesion level is at least 4B.

The ultra-thin glass as chemically strengthened by an ion exchange method and having undergone polishing, may have a hardness of 9H, a limiting bend radius of 2 mm or less and a pen drop height of 1 cm or more.

Optionally, pre-treatment of the ultra-thin glass substrate may be performed prior to deposition of the hard coating. Pre-treatment may include one or more of a combustion chemical vapor deposition treatment (such as a Pyrosil® treatment), silane treatment, plasma treatment, or fire treatment; such pretreatments typically assist in increasing the adhesion between hard coating and the ultra-thin glass substrate.

EXAMPLES

Example 1

40 g of 3-(2,3-epoxypropoxy)propyltrimethoxysilane (EMS) was reacted with 10-200 g of acetone, 3-10 g of 5% aqueous solution of sodium hydroxide at 40-90° C. for 30-120 minutes, followed by the addition of 50 g of water and further reaction at 40-90° C. After completion of the reaction, the solvents were removed by evaporation and the remaining mixture was washed with water and extracted by ethyl acetate. The obtained organic layer was then dried by magnesium sulfate and a viscous liquid (epoxy-containing polyorganosilsesquioxane, S1) was obtained after filtration and solvent distillation.

Example 2

40 g of 3-(acryloyloxy)propyltrimethoxysilane (AMS) was reacted with 5.76 g of 3-(2,3epoxypropoxy)propyltrimethoxysilane (EMS), 10-200 g of acetone, 3-10 g of 5% aqueous solution of sodium hydroxide at 40-90° C. for 30-120 minutes, followed by the addition of 50 g of water and further reaction at 40-90° C. After completion of the reaction, the solvents were removed by evaporation and the remaining mixture was washed with water and extracted by ethyl acetate. The obtained organic layer was then dried by magnesium sulfate and a viscous liquid (acrylate and epoxy-containing polyorganosilsesquioxane, S2) was obtained after filtration and solvent distillation.

Example 3

10 g of S2 synthesized in Example 2 was reacted with 2.1 g of monoaminopropyl terminated poly(dimethyl siloxane), PDMS-NH2 (Mw=2000), and 10 g of 2-butanone at 60-90° C. for 6 hours. The product S3 was obtained after removing solvent.

Example 4

A hard coating solution was prepared by blending 30 parts by weight of S3, 70 parts by weight of ethyl acetate, 2 parts by weight of diphenyl(2,4,6-trimethylbenzoyl)phosphine oxide (TPO) and 1.2 parts by weight of 1-hydroxycyclohexyl phenyl ketone (184). The prepared solution was applied to a 30 μm ultra-thin glass substrate by dip coating (for double-sided protection). The 30 μm ultra-thin glass was dipped in 10% (w/w) AMS methanol solution with 1% (w/w) water for 30 min and cleaned by methanol wipe before coating.

The single-sided or double-sided coated ultra-thin glass sample 1 was obtained after 5-minute drying in 80° C. oven and 2-minute UV curing under 157 mw/cm² radiation.

Example 5

A hard coating solution was prepared by blending 30 parts by weight of 51, 1.5 parts by weight of 3-perfluorooctyl-1, 2-epoxypropane, 70 parts by weight of ethyl acetate and 1.2 parts by weight of triarylsulfonium hexafluroantimonate salts mixed. The prepared solution was applied to a 30 μm ultra-thin glass substrate by dip coating (for double-sided protection). The 30 μm ultra-thin glass was dipped in 10% (w/w) EMS methanol solution with 1% (w/w) water for 30 min and cleaned by methanol wipe before coating.

The double-sided coated ultra-thin glass sample 2 was obtained after 5-minute drying in 80° C. oven and 2-minute UV curing under 157 mw/cm² radiation.

Example 6

The results of evaluation tests, whose methods were described above, are listed below:

| Sample name | HC thickness | Surface Hardness | #Pen Drop test | WCA before abrasion | WCA after abrasion | *Adhesion after 95° C. water immersion for 30-min water test |
|---|---|---|---|---|---|---|
| UTG sample 1 | 10 μm × 2 | 7-8H | 8 cm | 110° | 90° | 4-5B |
| UTG sample 2 | 10 μm × 2 | 7-8H | 8 cm | 113° | 105° | 4-5B |

M&G ® Pen G-5 having a 0.5 mm bullet pen point and a weight of 12 gram is employed and the tube having an inside diameter of 17 mm, an outside diameter of 21 mm.
*Adhesion Test Procedure - ASTM 3359 TEST METHOD B-CROSS-CUT TAPE TEST As used herein, terms "approximately", "basically", "substantially", and "about" are used for describing and explaining a small variation. When being used in combination with an event or circumstance, the term may refer to a case in which the event or circumstance occurs precisely, and a case in which the event or circumstance occurs approximately. As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all the ranges disclosed in the present disclosure include endpoints. The term "substantially coplanar" may refer to two surfaces within a few micrometers (μm) positioned along the same plane, for example, within 10 μm, within 5 μm, within 1 μm, or within 0.5 μm located along the same plane. When reference is made to "substantially" the same numerical value or characteristic, the term may refer to a value within ±10%, ±5%, ±1%, or ±0.5% of the average of the values.

Several embodiments of the present disclosure and features of details are briefly described above. The embodiments described in the present disclosure may be easily used as a basis for designing or modifying other processes and structures for realizing the same or similar objectives and/or obtaining the same or similar advantages introduced in the embodiments of the present disclosure. Such equivalent construction does not depart from the spirit and scope of the present disclosure, and various variations, replacements, and modifications can be made without departing from the spirit and scope of the present disclosure.

The invention claimed is:
1. A foldable ultrathin glass article, comprising:
an ultrathin chemically-tempered foldable glass substrate having a thickness of approximately 100 microns or less, a compressive surface stress of at least 100 MPa, and first and second surfaces;
a single-layer hard coating bonded to the first and/or second surface of the ultrathin tempered glass foldable substrate without an adhesive layer, wherein the hard coating includes at least one silsesquioxane having a silicon-oxygen core framework directly bonded to the ultrathin tempered glass foldable substrate;
wherein the ultrathin tempered glass foldable substrate with the hard coating bonded thereto has an impact resistance defined by a maximum pen drop height without glass failure that is at least four times greater than the ultrathin tempered glass foldable substrate without the hard coating;

wherein the hard coating has a surface hardness of at least 7H surface hardness and has a hydrophobic surface with a water contact angle of at least 100° and the coating has a transparency of at least 98 percent for light ranging from 400-700 nm when compared to the ultrathin tempered glass foldable substrate without the hard coating,
wherein the silsesquioxane is a polyorganosilsesquioxane represented by Formula 1:

$$[R^1R^2SiO_{3/2}] \qquad \text{Formula 1,}$$

where $R^1$ is at least one photo curable or thermally curable cross-linking group, $R^2$ is a fluorocarbon, alkyl or polydimethylsiloxane (PDMS);
wherein a molar ratio of overall $R^1$ to overall $R^2$ ranges from 100:1 to 1:100,
wherein a GPC evaluated number-average molecular weight has a range of 1000-30000.

2. The foldable ultrathin glass article of claim 1, wherein the ultrathin chemically-tempered foldable glass substrate is chemically tempered through surface ion exchange.

3. The foldable ultrathin glass article of claim 1, wherein the $R^1$ is an epoxy-cyclohexane group, a glycidyl group or an acrylate group.

4. The foldable ultrathin glass article of claim 1, wherein the impact resistance of the ultrathin tempered glass foldable substrate with the hard coating bonded thereto is at least approximately six times an impact resistance of the ultrathin tempered glass foldable substrate without the hard coating.

5. The foldable ultrathin glass article of claim 1, wherein the ultrathin tempered glass foldable substrate with the hard coating bonded thereto has a water contact angle of at least 110° and a remaining water contact angle of at least 90° after 2500 abrasion cycles using #0000 steel wool and 2.45 N/cm² pressure.

6. The foldable ultrathin glass article of claim 1, wherein the hard coating has a surface hardness of 8H-9H pencil surface hardness.

7. The foldable ultrathin glass article of claim 1, wherein an adhesion between the hard coating and the ultrathin chemically-tempered foldable glass substrate is at least 4B after a 30-minute 95° C. water bath test measured by a cross-hatch adhesion test.

8. The foldable ultrathin glass article of claim 1, wherein the hard coating uses a curing agent selected from a radical initiator, a cationic initiator, an amine, an imidazole, or an amino-formaldehyde.

9. The foldable ultrathin glass article of claim 1, wherein the hard coating has a thickness in a range of 5-100 micrometers.

10. The foldable ultrathin glass article of claim 1, wherein the hard coating is disposed on both the first and second surfaces of the ultrathin chemically-tempered foldable glass substrate.

11. The foldable ultrathin glass article of claim 1, wherein the hard coating is disposed on the first surface of the ultrathin chemically-tempered foldable glass substrate and a further coating is disposed on the second surface of the ultrathin chemically-tempered foldable glass substrate.

12. The foldable ultrathin glass article of claim 1, wherein the ultrathin chemically-tempered foldable glass substrate is pretreated prior to the hard coating being deposited thereon.

13. The foldable ultrathin glass article of claim 12, where the pretreatment is a combustion chemical vapor deposition treatment, a silane treatment, a plasma treatment, or fire treatment.

14. The foldable ultrathin glass article of claim 1, wherein the article can withstand bending of at least approximately 200,000 cycles.

15. A foldable display with the foldable ultrathin glass article of claim 1.

\* \* \* \* \*